United States Patent
Jiang et al.

(10) Patent No.: US 10,560,890 B2
(45) Date of Patent: Feb. 11, 2020

(54) ROAMING NETWORK ACCESS METHOD AND APPARATUS

(71) Applicant: Huawei Device Co., Ltd., Dongguan (CN)

(72) Inventors: Yinqing Jiang, Wuhan (CN); Li Shen, Beijing (CN); Guanzhong Tan, Shenzhen (CN); Shujun Dang, Beijing (CN); Xiaoyan Chen, Wuhan (CN); Xiaojian Liu, Wuhan (CN); Hui Jin, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

(21) Appl. No.: 15/300,231

(22) PCT Filed: Mar. 28, 2014

(86) PCT No.: PCT/CN2014/074274
§ 371 (c)(1),
(2) Date: Sep. 28, 2016

(87) PCT Pub. No.: WO2015/143706
PCT Pub. Date: Oct. 1, 2015

(65) Prior Publication Data
US 2017/0142648 A1    May 18, 2017

(51) Int. Cl.
*H04W 4/00* (2018.01)
*H04W 48/18* (2009.01)
(Continued)

(52) U.S. Cl.
CPC ........... *H04W 48/18* (2013.01); *H04W 8/06* (2013.01); *H04W 48/16* (2013.01)

(58) Field of Classification Search
None
See application file for complete search history.

(56) References Cited

U.S. PATENT DOCUMENTS 7,826,844 B2 * 11/2010 Cooper ............... H04W 48/18
  455/166.2
8,229,414 B1 * 7/2012 Hilyard ................. H04M 3/51
  455/419
(Continued)

FOREIGN PATENT DOCUMENTS

CN    1968502 A    5/2007
CN  101291542 A   10/2008
(Continued)

OTHER PUBLICATIONS

JP 2017-501443, Notice of Reasons for Rejection, dated Jan. 23, 2018.

*Primary Examiner* — Jinsong Hu
*Assistant Examiner* — Alexander J Yi
(74) *Attorney, Agent, or Firm* — Leydig, Voit & Mayer, Ltd.

(57) ABSTRACT

Embodiments of the present invention provide a roaming network access method and apparatus, where the method includes: obtaining a mobile country code MCC of a roaming area; obtaining a preferential roaming list, where the preferential roaming list is used to indicate information about at least one network that a user preferentially attempts to register with when the user is roaming; selecting a network that matches the MCC from the preferential roaming list and searching for the selected network; and each time a network is found by the searching, attempting to register with the found network. By means of the roaming network access method and apparatus provided in the embodiments of the present invention, duration of network searching performed by user equipment is shortened, time spent by the user equipment on initial network access in the roaming area is reduced.

21 Claims, 2 Drawing Sheets

(51) Int. Cl.
    *H04W 48/16*    (2009.01)
    *H04W 8/06*     (2009.01)

(56)            References Cited

U.S. PATENT DOCUMENTS

| | | | |
|---|---|---|---|
| 9,043,879 B1 * | 5/2015 | Reeves | H04W 12/08 |
| | | | 726/4 |
| 9,125,146 B1 * | 9/2015 | Edara | H04W 48/16 |
| 2003/0134637 A1 | 7/2003 | Cooper | |
| 2003/0232631 A1 | 12/2003 | Ohmori | |
| 2009/0062947 A1 * | 3/2009 | Lydon | G06F 17/30053 |
| | | | 700/94 |
| 2010/0105375 A1 | 4/2010 | Schroter | |
| 2010/0120395 A1 | 5/2010 | Chiba et al. | |
| 2011/0171925 A1 * | 7/2011 | Faccin | H04W 76/007 |
| | | | 455/404.1 |
| 2012/0243467 A1 | 9/2012 | Vallurupalli et al. | |
| 2012/0309391 A1 | 12/2012 | Zhang et al. | |
| 2014/0342732 A1 * | 11/2014 | Manalo | H04W 8/06 |
| | | | 455/433 |
| 2015/0119028 A1 * | 4/2015 | Zhang | H04W 48/18 |
| | | | 455/434 |

FOREIGN PATENT DOCUMENTS

| | | | | |
|---|---|---|---|---|
| CN | 101917694 A | 12/2010 | | |
| CN | 103188638 a | 7/2013 | | |
| EP | 1983700 A1 * | 10/2008 | | H04W 48/18 |
| EP | 2259629 B1 | 4/2013 | | |
| JP | 2004023391 A | 1/2004 | | |
| JP | 2007028479 A | 2/2007 | | |
| JP | 2007221786 A | 8/2007 | | |
| JP | 2012023694 A | 2/2012 | | |
| WO | 2009013792 A1 | 1/2009 | | |

\* cited by examiner

ROAMING NETWORK ACCESS METHOD AND APPARATUS

CROSS-REFERENCE TO RELATED APPLICATIONS

This application is a national stage of International Application No. PCT/CN2014/074274, filed on Mar. 28, 2014, which is hereby incorporated by reference in its entirety.

TECHNICAL FIELD

Embodiments of the present invention relate to communications technologies, and in particular, to a roaming network access method and apparatus.

BACKGROUND

After user equipment (User Equipment, UE for short) is powered on or when it is roaming, the primary task is to select a public land mobile network (Public Land Mobile Network, PLMN for short) and successfully register with the PLMN, and the UE can obtain normal communications services such as a voice service and a data service only in this way.

In the prior art, after UE is powered on, it first attempts to register with a public land mobile network that the UE successfully registered with (Registered PLMN, RPLMN for short) last time. If the registration fails, the UE performs full-band network searching. The UE searches for all networks according to frequency bands and radio access technologies (Radio Access Technologies, RAT for short) that are supported by the UE, and generates a list of available networks, where each element in the list includes a PLMN and a RAT of an available network. To facilitate faster registration of the UE with an available network, the UE needs to select a PLMN from the foregoing list of the found available networks according to a particular rule. For example, it is stipulated in the 3rd Generation Partnership Project (3rd Generation Partnership Project, 3GPP for short) specifications that UE selects a PLMN according to the following sequence: RPLMN→home public land mobile network (Home PLMN, HPLMN for short)→user controlled public land mobile network (User PLMN, UPLMN for short)→operator controlled public land mobile network (Operator PLMN, OPLMN for short)→other available PLMNs (OTHER Available PLMN).

Duration of network searching performed by the UE mainly depends on factors such as a frequency band and a RAT that are supported by the UE, a quantity of coverage cells in an area in which the UE is located, and software and hardware restrictions of the UE. With commercialization of the Long Term Evolution (Long Term Evolution, LTE for short) technology, the UE can support more RATs. When the UE is roaming, the UE needs to look over all standards and frequency bands that are supported by the UE and generate a list of available networks before selecting a PLMN and attempting to register with the selected PLMN, which results in an excessively long time of network searching.

Duration of PLMN selection performed by the UE mainly depends on an order of the foregoing found available networks in the list. In a scenario in which the UE is roaming, if there is a large quantity of operators in a roaming area of the UE, the list of the found available networks is long, for example, there are many small operators in Hong Kong, America, and some European countries, and the number of elements in the list of available networks may reach dozens. In addition, a PLMN selection process is a trial-and-error process; for each selected PLMN and RAT, a registration attempt process of the UE involves multiple rounds of network-wide signaling message interaction; in addition, when one registration attempt fails, the UE needs to continue to attempt to register with the same PLMN and RAT until a preset stop condition is satisfied, for example, a quantity of failed attempts reaches a preset quantity-of-failed-attempts threshold, leading to an excessively long time of PLMN selection.

In the prior art, when UE initially accesses a network in a roaming area, it takes a relatively long time for the UE to successfully register with a network in the roaming area, and user experience is affected due to an excessively long waiting time.

SUMMARY

Embodiments of the present invention provide a roaming network access method and apparatus, to reduce time spent by user equipment on initial network access in a roaming area.

According to a first aspect, an embodiment of the present invention provides a roaming network access method, where the method includes:

obtaining a mobile country code MCC of a roaming area;

obtaining a preferential roaming list, where the preferential roaming list is used to indicate information about at least one network that a user preferentially attempts to register with when the user is roaming;

selecting a network that matches the MCC from the preferential roaming list and searching for the selected network; and each time a network is found by the searching, attempting to register with the found network.

According to the first aspect, in a first implementation manner of the first aspect, the obtaining an MCC of a roaming area includes:

obtaining the MCC of the roaming area according to a public land mobile network PLMN supported by a camped-on emergency service cell.

According to the first aspect, in a second implementation manner of the first aspect, the obtaining an MCC of a roaming area includes:

obtaining the MCC of the roaming area according to an obtained schedule and/or flight information of the user.

According to the first aspect, in a third possible implementation manner of the first aspect, the selecting a network that matches the MCC from the preferential roaming list and searching for the selected network includes:

obtaining, by means of screening, at least one network that matches the MCC from the preferential roaming list, to generate an available preferential roaming list; and selecting a network in the available preferential roaming list one by one and searching for the selected network.

According to the first aspect, in a fourth possible implementation manner of the first aspect, the selecting a network that matches the MCC from the preferential roaming list and searching for the selected network includes:

selecting the network that matches the MCC from the preferential roaming list;

obtaining a frequency band that matches the selected network; and searching for the selected network according to the selected network and the obtained frequency band that matches the selected network.

According to the first aspect and any one of the first to fourth possible implementation manners of the first aspect, in a fifth possible implementation manner of the first aspect, the preferential roaming list is at least one of the following:

an operator controlled public land mobile network OPLMN, a user controlled public land mobile network UPLMN, and historical roaming information, where the historical roaming information is used to record a network that the user has successfully registered with and/or has failed to register with during roaming.

According to a second aspect, an embodiment of the present invention provides a roaming network access apparatus, where the apparatus includes:

an obtaining module, configured to obtain a mobile country code MCC of a roaming area, where the obtaining module is further configured to obtain a preferential roaming list, where the preferential roaming list is used to indicate information about at least one network that a user preferentially attempts to register with when the user is roaming;

a searching module, configured to select, from the preferential roaming list obtained by the obtaining module, a network that matches the MCC obtained by the obtaining module, and search for the selected network; and a registration module, configured to: each time the searching module finds a network by the searching, attempt to register with the found network.

According to the second aspect, in a first possible implementation manner of the second aspect, the obtaining module is specifically configured to obtain the MCC of the roaming area according to a public land mobile network PLMN supported by a camped-on emergency service cell.

According to the second aspect, in a second possible implementation manner of the second aspect, the obtaining module is specifically configured to obtain the MCC of the roaming area according to an obtained schedule and/or flight information of the user.

According to the second aspect, in a third possible implementation manner of the second aspect, the searching module is specifically configured to:

obtain, by means of screening, at least one network that matches the MCC from the preferential roaming list, to generate an available preferential roaming list; and select a network in the available preferential roaming list one by one and search for the selected network.

According to the second aspect, in a fourth possible implementation manner of the second aspect, the searching module is specifically configured to:

select the network that matches the MCC from the preferential roaming list;

obtain a frequency band that matches the selected network; and search for the selected network according to the selected network and the obtained frequency band that matches the selected network.

According to the second aspect and any one of the first to fourth possible implementation manners of the second aspect, in a fifth possible implementation manner of the second aspect, the preferential roaming list is at least one of the following:

an operator controlled public land mobile network OPLMN, a user controlled public land mobile network UPLMN, and historical roaming information, where the historical roaming information is used to record a network that the user has successfully registered with and/or has failed to register with during roaming.

Compared with the prior art, by means of the roaming network access method and apparatus provided in the embodiments of the present invention, when user equipment initially accesses a network in a roaming area, the user equipment neither needs to look over all RATs and frequency bands that are supported by the user equipment nor needs to select a PLMN according to the following sequence: HPLMN→UPLMN→OPLMN→OTHER Available PLMN; instead, the user equipment selects, according to an MCC of the roaming area, a network that matches the MCC of the roaming area from a preferential roaming list used to indicate information about at least one network that a user preferentially attempts to register with when the user is roaming, and searches for the selected network, and each time the user equipment finds a network by the searching, the user equipment attempts to register with the found network, which shortens duration of network searching performed by the user equipment; moreover, the user equipment pertinently selects, based on the MCC of the roaming area and the preferential roaming list, a network for network searching and registration, so that time spent by the user equipment on initial network access in the roaming area is reduced and user experience is improved.

DESCRIPTION OF EMBODIMENTS

Figure 1:
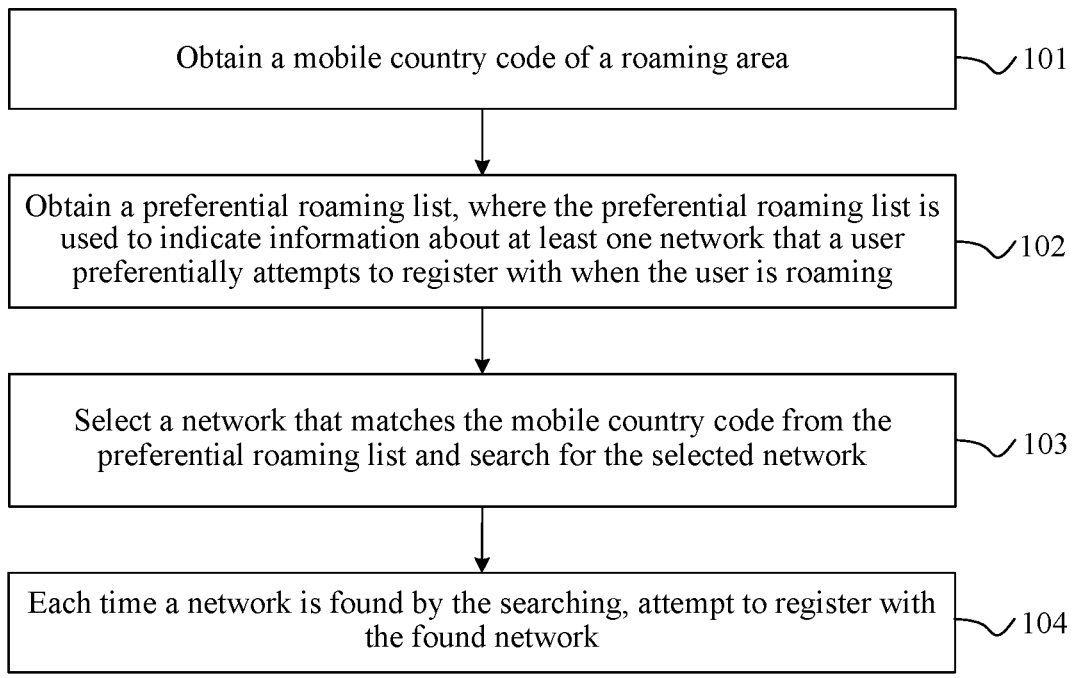
FIG. 1 is a flowchart of a roaming network access method according to an embodiment of the present invention.

FIG. 1 is a flowchart of a roaming network access method according to an embodiment of the present invention. As shown in FIG. 1, the method includes:

101: Obtain a mobile country code (Mobile Country Code, MCC for short) of a roaming area.

102: Obtain a preferential roaming list, where the preferential roaming list is used to indicate information about at least one network that a user preferentially attempts to register with when the user is roaming.

There is no strict chronological order between step 101 and step 102: step 101 may be performed before step 102, or step 101 may be performed after step 102, or step 101 and step 102 may be performed simultaneously.

103: Select a network that matches the MCC from the preferential roaming list and search for the selected network.

104: Each time a network is found by the searching, attempt to register with the found network.

If the registration is successful, network searching may be stopped.

Specifically, the method may be executed by user equipment, and the method may be applied to a scenario in which the user equipment initially accesses a network in a roaming area. The user equipment may be a communications device such as a cellular phone (cellular phone) or a tablet. The information about the network in the preferential roaming list includes PLMN information of the network, or PLMN information of the network and information about a RAT supported by the PLMN.

Optionally, the preferential roaming list is at least one of the following: OPLMN, UPLMN, and historical roaming information. The historical roaming information is used to record a network that the user has successfully registered with and/or has failed to register with during roaming.

Compared with the prior art, by means of the roaming network access method provided in this embodiment of the present invention, when user equipment initially accesses a network in a roaming area, the user equipment neither needs to look over all RATs and frequency bands that are supported by the user equipment nor needs to select a PLMN according to the following sequence: HPLMN→UPLMN→OPLMN→OTHER Available PLMN; instead, the user equipment selects, according to an MCC of the roaming area, a network that matches the MCC of the roaming area from a preferential roaming list used to indicate information about at least one network that a user preferentially attempts to register with when the user is roaming, and searches for the selected network, and each time the user equipment finds a network by the searching, the user equipment attempts to register with the found network, which shortens duration of network searching performed by the user equipment; moreover, the user equipment pertinently selects, based on the MCC of the roaming area and the preferential roaming list, a network for network searching and registration, so that time spent by the user equipment on initial network access in the roaming area is reduced and user experience is improved.

Optionally, based on the foregoing embodiment, an implementation manner of obtaining the MCC of the roaming area is that: the user equipment obtains the MCC of the roaming area according to a PLMN supported by a camped-on emergency service cell.

Another implementation manner of obtaining the MCC of the roaming area is that: the user equipment obtains the MCC of the roaming area according to an obtained schedule and/or flight information of the user. Specifically, the schedule and/or flight information of the user includes destination (roaming area) information, and the user equipment obtains the destination information according to the schedule and/or flight information of the user, and obtains the MCC of the destination (that is, the roaming area) according to the obtained destination information and in a manner such as table lookup. It may be understood that the user may manually set the schedule and/or flight information of the user on the user equipment; the schedule and/or flight information of the user may be set before a plane takes off or after the user equipment is powered on in the roaming area; optionally, the schedule and/or flight information of the user may be stored in a specific application of the user equipment, where the specific application is used to provide the MCC information of the destination; and the user equipment obtains, according to the destination, the MCC of the destination in advance by using the specific application.

Optionally, based on the foregoing embodiment, an implementation manner of selecting a network that matches the MCC from the preferential roaming list and searching for the selected network includes at least one of the following:

Implementation Manner 1:

The user equipment obtains, by means of screening, at least one network that matches the MCC from the preferential roaming list, to generate an available preferential roaming list; and selects a network in the available preferential roaming list one by one and searches for the selected network.

Specifically, the user equipment obtains, by means of screening, a PLMN that matches the MCC from the preferential roaming list, and generates an available roaming list with reference to a RAT that is recorded in the preferential roaming list and that is supported by the PLMN obtained by means of screening; each element in the available roaming list includes information about a PLMN and information about a RAT supported by the PLMN; the user equipment selects elements in the preferential roaming list one by one and searches for a network; and each time a network is found by the searching, the user equipment attempts to register with the found network.

Implementation Manner 2:

The user equipment selects the network that matches the MCC from the preferential roaming list; obtains a frequency band that matches the selected network; and searches for the selected network according to the selected network and the obtained frequency band that matches the selected network.

Specifically, the user equipment selects PLMNs that match the MCC from the preferential roaming list, and obtains, according to RATs that are recorded in the preferential roaming list and can be supported by the selected PLMNs, available frequency bands of the RATs from a frequency band list, to generate a search attempt list; each element in the search attempt list includes a PLMN, a RAT supported by the PLMN, and an available frequency band of the RAT; the user equipment selects elements in the search attempt list one by one and searches for a network; and each time a network is found by the searching, the user equipment attempts to register with the found network.

The frequency band list in the user equipment stores global MCC-MNCs, and standard and frequency band information. The frequency band list is stored in the user equipment in a database form and can be updated dynamically.

By means of the technical solution provided by the foregoing implementation manner 2, after selecting a PLMN that matches an MCC of a roaming area from a preferential roaming list, the user equipment does not need to look over all frequency bands supported by the selected PLMN or all available frequency bands of a RAT supported by the selected PLMN; instead, the user equipment searches only a frequency band that can be supported, for the selected PLMN, by an operator network in the roaming area, so that duration of network searching performed by the user equipment is shortened, time spent by the user equipment on initial network access in the roaming area is reduced, and user experience is improved.

Optionally, after obtaining the available frequency bands of the RATs from the frequency band list to generate the search attempt list, the user equipment deletes a RAT and a frequency band that are not supported by the user equipment from the search attempt list according to a RAT and a frequency band that can be supported by the user equipment, to further reduce a network searching range and shorten network searching duration.

Optionally, based on the foregoing embodiment, the historical roaming information includes a first roaming network list and/or a second roaming network list; the first roaming network list is used to record a network that the user has successfully registered with during roaming, and the second roaming network list is used to record a network that the user has failed to register with during roaming.

Further, if the preferential roaming list includes the historical roaming information, each time after the user equipment attempts to register with a found PLMN, the user equipment updates the historical roaming information in real time according to whether the registration is successful:

(1) When the historical roaming information includes the first roaming network list:

if the user equipment determines that it fails to register with the found PLMN, the user equipment determines whether the found PLMN appears in the first roaming network list, and when it is determined that the found PLMN appears in the first roaming network list, the user equipment deletes the found PLMN from the first roaming network list; or if the user equipment determines that it successfully registers with the found PLMN, the user equipment determines whether the found PLMN appears in the first roaming network list, and when it is determined that the found PLMN does not appear in the first roaming network list, the user equipment adds the found PLMN to the first roaming network list.

(2) When the historical roaming information includes the second roaming network list:

if the user equipment determines that it fails to register with the found PLMN, the user equipment determines whether the found PLMN appears in the second roaming network list, and when it is determined that the found PLMN does not appear in the second roaming network list, the user equipment adds the found PLMN to the second roaming network list; or if the user equipment determines that the it successfully registers with the found PLMN, the user equipment determines whether the found PLMN appears in the second roaming network list, and when it is determined that the found PLMN appears in the second roaming network list, the user equipment deletes the found PLMN from the second roaming network list.

Optionally, based on the foregoing embodiment, the preferential roaming list is stored in a non-volatile memory (non-volatile memory) of the user equipment.

Further, a backup of the preferential roaming list is stored in a cloud. The cloud is used to store a preferential roaming list of at least one user, and a preferential roaming list of each user is stored according to an identifier of each user; the identifier may be information characterizing a user identity, for example, a cloud account and a phone number of a user or an IMEI sequence number of user equipment. After a user loses or replaces the user equipment, user equipment after the replacement may obtain the preferential roaming list of the user from the cloud.

A feasible implementation manner of obtaining, by the user equipment, the preferential roaming list is: detecting, by the user equipment, whether the preferential roaming list is stored in the non-volatile memory of the user equipment; if not, obtaining, by the user equipment from the cloud, the preferential roaming list stored in the cloud; or if yes, obtaining, by the user equipment, the preferential roaming list from the non-volatile memory, and performing information synchronization with the cloud so that version information (for example, a synchronization identifier and a timestamp) of the preferential roaming list stored in the non-volatile memory of the user equipment is the same as version information of the preferential roaming list stored in the cloud.

Further, after the preferential roaming list is updated, the user equipment performs information synchronization with the cloud and synchronously uploads a change in storage information in the preferential roaming list to the cloud, so as to update the preferential roaming list stored in the cloud and the version information thereof.

Optionally, based on the foregoing embodiment, the preferential roaming list is stored in a subscriber identity module (SIM). A feasible implementation manner of storing the preferential roaming list in the subscriber identity module is: adding, to the SIM, a new elementary file (Elementary File, EF for short), EF-Roam (EF-Roam), where the EF-Roam is used to store the preferential roaming list of the user.

That the preferential roaming list records the historical roaming information is used as an example. When the user equipment initially accesses a network in a roaming area:

After a registration success message or a location update success message is received, information about a current available network that the user equipment successfully registers with is stored in the EF-Roam.

When a registration request of the user equipment is rejected, where for example, a rejection reason is PLMN not allowed (PLMN not allowed), the user equipment determines whether a current available network that the user equipment fails to register with is recorded in the EF-Roam; and if yes, the user equipment deletes the available network from the EF-Roam.

Optionally, a valid time field is set in the EF-Roam. While information about an available network is newly added to the EF-Roam, a valid time is started, and when the valid time expires, the information about the available network is automatically deleted from the EF-Roam.

Figure 2:
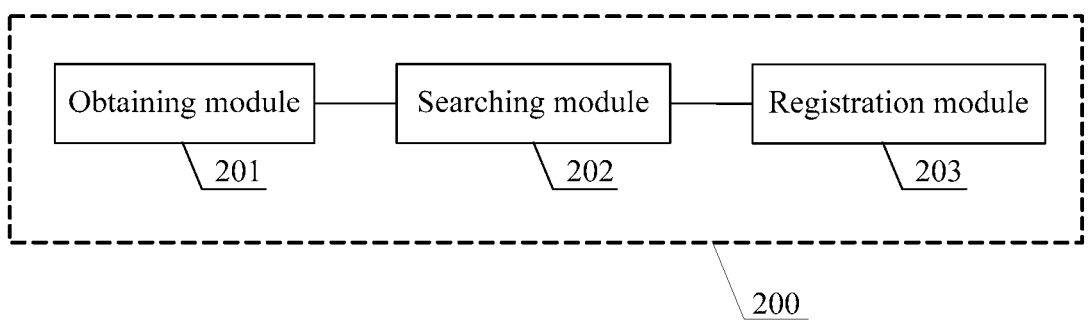
FIG. 2 is a schematic structural diagram of a roaming network access apparatus according to an embodiment of the present invention.

FIG. 2 is a schematic structural diagram of a roaming network access apparatus according to an embodiment of the present invention. As shown in FIG. 2, the roaming network access apparatus 200 provided in this embodiment of the present invention includes:

an obtaining module 201, configured to obtain a mobile country code MCC of a roaming area, where the obtaining module 201 is further configured to obtain a preferential roaming list, where the preferential roaming list is used to indicate information about at least one network that a user preferentially attempts to register with when the user is roaming;

a searching module 202, configured to select, from the preferential roaming list obtained by the obtaining module 201, a network that matches the MCC obtained by the obtaining module 201 and search for the selected network; and a registration module 203, configured to: each time the searching module 202 finds a network by the searching, attempt to register with the found network.

The roaming network access apparatus 200 provided in this embodiment of the present invention may be disposed on user equipment. The roaming network access apparatus 200 may be configured to perform the technical solution of the method embodiment shown in FIG. 1, and has a similar implementation principle and technical effect, and details are not described herein again.

Optionally, the obtaining module 201 is specifically configured to obtain the MCC of the roaming area according to a PLMN supported by a camped-on emergency service cell.

Optionally, the obtaining module 201 is specifically configured to obtain the MCC of the roaming area according to an obtained schedule and/or flight information of the user.

Optionally, the searching module 202 is specifically configured to:

obtain, by means of screening, at least one network that matches the MCC from the preferential roaming list, to generate an available preferential roaming list; and select a network in the available preferential roaming list one by one and search for the selected network.

Optionally, the searching module 202 is specifically configured to:

select the network that matches the MCC from the preferential roaming list;

obtain a frequency band that matches the selected network; and search for the selected network according to the selected network and the obtained frequency band that matches the selected network.

Based on the foregoing embodiment, the preferential roaming list is at least one of the following: an operator controlled public land mobile network OPLMN, a user controlled public land mobile network UPLMN, and historical roaming information, where the historical roaming information is used to record a network that the user has successfully registered with and/or has failed to register with during roaming.

Figure 3:
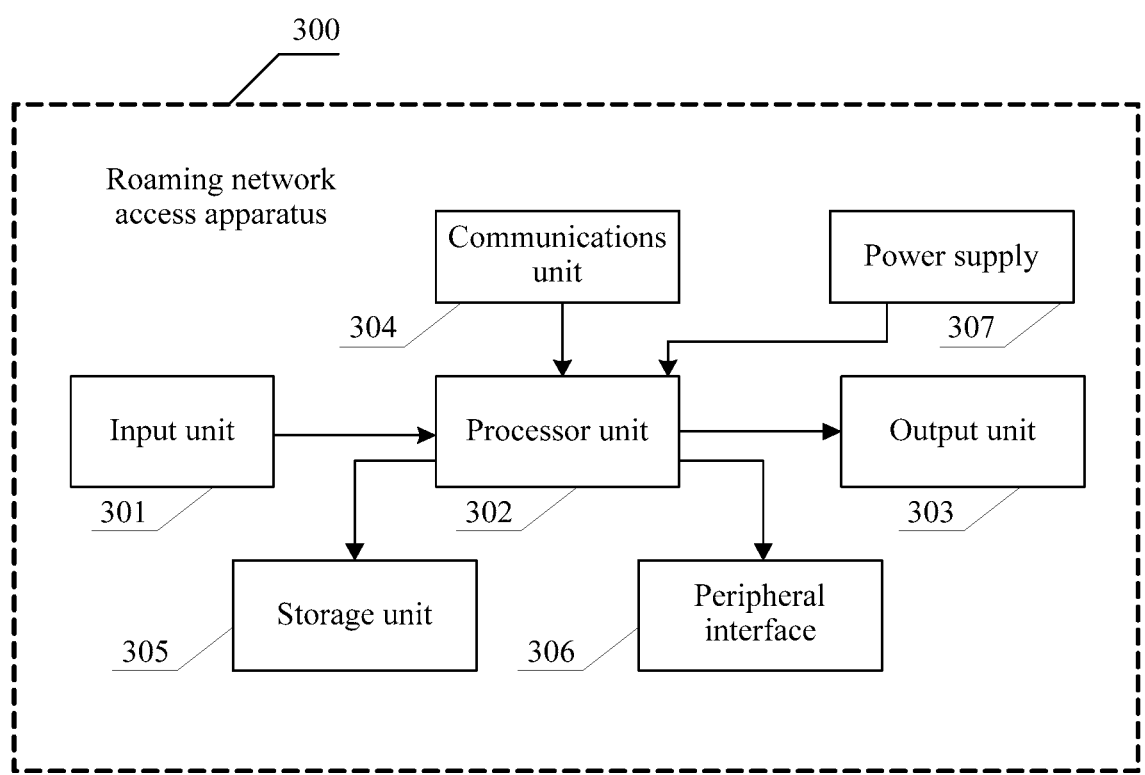
FIG. 3 is another schematic structural diagram of a roaming network access apparatus according to an embodiment of the present invention.

FIG. 3 is another schematic structural diagram of a roaming network access apparatus according to an embodiment of the present invention. As shown in FIG. 3, a roaming network access apparatus 300 provided in this embodiment of the present invention includes components such as an input unit 301, a processor unit 302, an output unit 303, a communications unit 304, a storage unit 305, a peripheral interface 306, and a power supply 307. These components communicate with each other by using one or more buses. A person skilled in the art may understand that the structure of the roaming network access apparatus 300 shown in FIG. 3 does not constitute a limitation to the present invention, and the structure may be a bus structure or a star structure, and may also include more or fewer components than those shown in FIG. 3, or some components may be combined, or a different component deployment may be used. In this implementation manner of the present invention, the roaming network access apparatus 300 may be any mobile or portable communications device, including, but not limited to: a mobile phone, a mobile computer, a tablet, a personal digital assistant (Personal Digital Assistant, PDA), a media player, a smart television, a combination of two or more of the foregoing items, and the like.

The input unit 301 is configured to implement interaction between a user and the roaming network access apparatus 300 and/or information input to the roaming network access apparatus 300. For example, the input unit 301 may receive digital or character information entered by a user, so as to generate signal input related to user settings or function control. In a specific implementation manner of the present invention, the input unit 301 may be a touch panel, or may be another human-computer interaction interface such as a physical input key or a microphone, or may be another external information capturing apparatus such as a camera. The touch panel, also referred to as a touchscreen or a touchscreen, may collect a touch operation motion performed by a user on the touch panel or an operation motion approaching the touch panel performed by a user, for example, an operation motion performed by a user on or near the touch panel by using any suitable object or accessory such as a finger or a stylus, and a corresponding connection apparatus is driven according to a preset program. Optionally, the touch panel may include two parts: a touch detection apparatus and a touch controller. The touch detection apparatus detects a touch operation of a user, converts the detected touch operation to an electrical signal, and sends the electrical signal to the touch controller; and the touch controller receives the electrical signal from the touch detection apparatus, converts the electrical signal to touch point coordinates, and then sends the touch point coordinates to the processor unit 302. The touch controller may also receive and execute a command sent by the processor unit 302. In addition, the touch panel may be implemented by using multiple types of touch panels, such as a resistive touch panel, a capacitive touch panel, an infrared (Infrared) touch panel, or a surface acoustic wave touch panel. In other implementation manners of the present invention, the physical input key used by the input unit 301 may include, but is not limited to one or more of the following: a physical keyboard, a function key (such as a volume control key and a switch key), a trackball, a mouse, a joystick, and the like. A microphone-form input unit may collect an audio entered by a user or an environment and convert the audio to a command that is in a form of an electrical signal and that can be executed by the processor unit 302.

In some other implementation manners of the present invention, the input unit 301 may also be various types of sensors, for example, a Hall element, configured to detect physical quantities of the roaming network access apparatus 300, such as a force, torque, a pressure, a stress, a location, a shift, a speed, an acceleration, an angle, an angular velocity, revolutions, a rotational speed, and a time when a working state changes, and convert the physical quantities to electric quantities for detection and control. Other sensors may include a gravity sensor, a tri-axis accelerometer, a gyroscope, and the like.

The processor unit 302 is a control center of the roaming network access apparatus 300, and is to be connected to various parts of the entire roaming network access apparatus 300 by using various interfaces and lines. By running or executing a software program and/or module stored in the storage unit 305, and invoking data stored in the storage unit 305, the processor unit 302 implements various functions and/or data processing of the roaming network access apparatus 300. The processor unit 302 may include an integrated circuit (Integrated Circuit, IC for short), for example, the processor unit 302 may include a single packaged IC or multiple packaged ICs having a same function or different functions. For example, the processor unit 302 may include only a central processing unit (Central Processing Unit, CPU for short), or may be a combination of a GPU, a digital signal processor (Digital Signal Processor, DSP for short), and a control chip (such as a baseband chip) in the communications unit 304. In this implementation manner of the present invention, the CPU may be a single computing core, or may include multiple computing cores.

The communications unit 304 is configured to implement communication between the roaming network access apparatus 300 and another device; and a data packet may be received or sent by using the communications unit 304. The communications unit 304 may include communications modules such as a wireless local area network (Wireless Local Area Network, wireless LAN for short) module, a Bluetooth module, a baseband (Base Band) module; and a radio frequency (Radio Frequency, RF for short) circuit corresponding to the communications modules, configured to perform wireless LAN communication, Bluetooth communication, infrared communication, and/or cellular communications system communication, for example, Wideband Code Division Multiple Access (Wideband Code Division Multiple Access, W-CDMA for short) and/or High Speed Downlink Packet Access (High Speed Downlink Packet Access, HSDPA for short). The communications module is configured to control communication between components in the roaming network access apparatus 300, and may support direct memory access (Direct Memory Access).

In different implementation manners of the present invention, the communications modules in the communications unit 304 are generally presented in a form of integrated circuit chips (Integrated Circuit Chip), and may be combined selectively, and the communications unit 304 does not need to include all the communications modules and corresponding antenna groups. For example, the communications unit 304 may include only the baseband chip, an RF chip, and a corresponding antenna, so as to provide a communication function in a cellular communications system. By means of a radio communications connection, such as wireless LAN access or WCDMA access, established by the communications unit 304, the roaming network access apparatus 300 may be connected to a cellular network (Cellular Network) or the Internet (Internet). In some optional implementation manners of the present invention, the communications module in the communications unit 304, such as the baseband module, may be integrated into the processor unit 302; an APQ+MDM series platform provided by Qualcomm (Qualcomm) is a typical example.

The output unit 303 includes, but is not limited to: a video output unit and an audio output unit. The video output unit is configured to output texts, images, and/or videos. The video output unit may include a display panel, for example, a display panel configured by using an LCD (Liquid Crystal Display, liquid crystal display), an OLED (Organic Light-Emitting Diode, organic light-emitting diode), and a field emission display (field emission display, FED for short), or the like. Alternatively, the video output unit may include a reflective display such as an electrophoretic (electrophoretic) display, or a display using a technology of interferometric modulation of light (Interferometric Modulation of Light). The video output unit may include a single display or multiple displays of different sizes. In a specific implementation manner of the present invention, the touch panel used by the foregoing input unit 301 may be also used as a display panel of the output unit 303. For example, after detecting a touch gesture operation on the touch panel or a gesture operation approaching the touch panel, the touch panel sends the gesture to the processor unit 302 to determine a type of a touch event, and then the processor unit 302 provides a corresponding visual output on the display panel according to the type of the touch event. Although in FIG. 3, the input unit 301 and the output unit 303 are used as two separate components to implement input and output functions of the roaming network access apparatus 300, in some embodiments, the touch panel and the display panel may be integrated to implement the input and output functions of the roaming network apparatus 300. For example, the video output unit may display various graphical user interfaces (Graphical User Interface, GUI for short) to serve as virtual control components, which include, but are not limited to: a window, a scroll bar, an icon, and a clipbook, to help a user perform an operation in a touch manner.

In a specific implementation manner of the present invention, the video output unit includes a filter and an amplifier, configured to filter and amplify a video generated by the processor unit 302. The audio output unit includes a digital-to-analog converter, configured to convert an audio signal generated by the processor unit 302 from a digital format to an analog format.

The storage unit 305 may be configured to store a software program and module. By running the software program and module stored in the storage unit 305, the processor unit 302 performs various functional applications of the roaming network access apparatus 300 and implements data processing. The storage unit 305 mainly includes a program storage area and a data storage area. The program storage area may store an operating system, and an application program required by at least one function, for example, a sound playback function and an image display function. The data storage area may store data (such as audio data and an address book) created according to use of the roaming network access apparatus 300, and the like. In a specific implementation manner of the present invention, the storage unit 305 may include a volatile memory, such as a non-volatile random access memory (Nonvolatile Random Access Memory, NVRAM for short), a phase change RAM (Phase Change RAM, PRAM for short), and a magetoresistive RAM (Magetoresistive RAM, MRAM for short), and may further include a non-volatile memory, such as at least one magnetic disk storage component, an electrically erasable programmable read-only memory (Electrically Erasable Programmable Read-Only Memory, EEPROM for short), and a flash memory component such as a NOR flash memory (NOR flash memory) or a NAND flash memory (NAND flash memory). The non-volatile memory stores an operating system and an application program that are executed by the processor unit 302. The processor unit 302 loads a to-be-run program and data from the non-volatile memory to a memory and stores digital content in a mass storage apparatus. The operating system includes various components and/or drivers configured to control and manage routine system tasks such as memory management, storage device control, and power management, and facilitate communication between a variety of software and hardware. In this implementation manner of the present invention, the operating system may be the Android system of Google, the iOS system developed by Apple or the Windows operating system developed by Microsoft, or may be an embedded operating system such as Vxworks.

The application program includes any application installed on the roaming network access apparatus 300, including but not limited to: a browser, an email, an instant messaging service, word processing, keyboard virtualization, a window widget (Widget), encryption, digital right management, speech recognition, speech copy, positioning (such as a function provided by a Global Positioning System), music playback, and the like.

Specifically, in this embodiment of the present invention, the storage unit 305 stores program data, and the processor unit 302 executes the program data to obtain an MCC of a roaming area. The communications unit 304 is further configured to obtain a preferential roaming list from a network server, where the preferential roaming list is used to indicate information about at least one network that a user preferentially attempts to register with when the user is roaming. Optionally, the storage unit 305 may store the preferential roaming list. The processor unit 302 executes the program data stored in the storage unit 305, so as to select a network that matches the MCC from the preferential roaming list obtained by the communications unit 304 or from the preferential roaming list stored in the storage unit 305; the communications unit 304 is further configured to: search for the selected network according to the network that matches the MCC and that is selected by the processor unit 302, and each time a network is found by the searching, attempt to register with the found network.

Further, optionally, the storage unit 305 stores program data, and the processor unit 302 executes the program data, so as to obtain the MCC of the roaming area according to a PLMN supported by a camped-on emergency service cell, or obtain the MCC of the roaming area according to an obtained schedule and/or flight information of the user.

The power supply 307 is configured to supply power to different components of the roaming network access apparatus 300 to maintain operation of the components. It is generally understood that, the power supply may be a built-in battery such as a common lithium-ion battery and a NiMH battery, and may also include an external power supply that directly supplies power to the roaming network access apparatus 300, such as an AC adapter. In some implementation manners of the present invention, the power supply 307 may have a boarder definition, for example, the power supply 307 may include a power management system, a charging system, a power fault detection circuit, a power converter or inverter, a power status indicator (such as a light emitting diode), and any other component associated with electrical energy generation, management, and distribution of the roaming network access apparatus 300.

It should be noted that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the foregoing embodiments, the description of each embodiment has respective focuses. For a part that is not described in detail in an embodiment, refer to related descriptions in other embodiments. In addition, the relational terms such as first and second are used only to differentiate an entity from another entity, and do not require or imply any actual relationship or sequence between these entities.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, and reference or a combination may be made between the technical solutions provided in each embodiment. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A roaming network access method, comprising:
   obtaining a mobile country code (MCC) of a roaming area according to a public land mobile network (PLMN) supported by a camped-on emergency service cell;
   obtaining a preferential roaming list, wherein the preferential roaming list is used to indicate information about at least one network that a user equipment preferentially attempts to register with when the user equipment is roaming,
   wherein: the preferential roaming list includes historical roaming information, information about a radio access technology (RAT) supported by the PLMN, and at least one of the following: an operator controlled public land mobile network (OPLMN), and a user controlled public land mobile network (UPLMN);
   the historical roaming information is used to record information about one or both of a first roaming network that the user equipment has successfully registered with during roaming and a second roaming network that the user equipment has failed to register with during roaming;
   the preferential roaming list is stored in a non-volatile memory of the user equipment, and a backup of the preferential roaming list is stored in a cloud server; and
   the backup of the preferential roaming list is stored according to an identifier of each user comprising a cloud account or a phone number of a user, or an International Mobile Equipment Identity (IMEI) sequence number of the user equipment;
   selecting a network that matches the MCC from the preferential roaming list and searching for the selected network, wherein selecting the network that matches the MCC from the preferential roaming list comprises selecting PLMNs that match the MCC from the preferential roaming list;
   obtaining, according to RATs that are recorded in the preferential roaming list and are supportable by the selected PLMNs, available frequency bands of the RATs from a frequency band list;
   each time a network is found by the searching, attempting to register with a network performing information synchronization with the network server to update the backup of the preferential roaming list; and
   updating the preferential roaming list with the historical roaming information in real time according to whether the user equipment has successfully registered.

2. The method according to claim 1, wherein the selecting a network that matches the MCC from the preferential roaming list and searching for the selected network comprises:
   obtaining at least one network that matches the MCC from the preferential roaming list, to generate an available preferential roaming list; and
   selecting a network in the available preferential roaming list one by one and searching for the selected network.

3. The method according to claim 1, wherein the identifier is a cloud account, a phone number of a user, or an IMEI sequence number of user equipment.

4. The method according to claim 1, wherein the performing information synchronization with the network server comprises:
   performing information synchronization with the network server to update a timestamp of the backup of the preferential roaming list.

5. The method according to claim 1, wherein the performing information synchronization with the network server comprises:
   performing information synchronization with the network server to update a synchronization identifier of the backup of the preferential roaming list.

6. A roaming network access apparatus, comprising:
   a storage device, configured to store program data;
   a processor, configured to execute the program data to:
   obtain a mobile country code (MCC) of a roaming area according to a public land mobile network (PLMN) supported by a camped-on emergency service cell;
   obtain a preferential roaming list, wherein:
   the preferential roaming list is used to indicate information about at least one network that the apparatus preferentially attempts to register with when the apparatus is roaming;
   the preferential roaming list includes historical roaming information, information about a radio access technology (RAT) supported by the PLMN, and at
   least one of the following: an operator controlled public land mobile network (OPLMN), and a user controlled public land mobile network (UPLMN);

the historical roaming information is used to record information about one or both of a first roaming network that a user equipment has successfully registered with during roaming and a second roaming network that the user equipment has failed to register with during roaming;

the preferential roaming list is stored in a non-volatile memory of the user equipment, and a backup of the preferential roaming list is stored in a cloud server;

the backup of the preferential roaming list is stored according to an identifier of each user comprising a cloud account or a phone number of a user, or an International Mobile Equipment Identity (IMEI) sequence number of the user equipment;

select, from the preferential roaming list, a network that matches the MCC, and search for the selected network, wherein to select the network that matches the MCC from the preferential roaming list, the processor is further configured to select PLMNs that the MCC from the preferential roaming list;

obtain, according to radio access technologies (RATs) that are recorded in the preferential roaming list and are supportable by the selected PLMNs, available frequency bands of the RATs from a frequency band list;

each time a network is found by the searching, attempt to register with a network perform information synchronization with the network server to update the backup of the preferential roaming list, and update the preferred preferential roaming list with the historical roaming information in real time according to whether the user equipment has successfully registered.

7. The apparatus according to claim 6, wherein the processor is configured to:
obtain at least one network that matches the MCC from the preferential roaming list, to generate an available preferential roaming list; and
select a network in the available preferential roaming list one by one and search for the selected network.

8. The apparatus according to claim 6, wherein the processor is configured to:
select the network that matches the MCC from the preferential roaming list;
obtain a frequency band that matches the selected network; and
search for the selected network according to the obtained frequency band that matches the selected network.

9. The apparatus according to claim 6, wherein the processor is configured to:
perform information synchronization with the network server to update a timestamp of the backup of the preferential roaming list.

10. The apparatus according to claim 6, wherein the processor is configured to:
perform information synchronization with the network server to update a synchronization identifier of the backup of the preferential roaming list.

11. The method according to claim 1 further comprising stopping the searching for the selected network when the attempting to register for the network found by the search is successful.

12. The method according to claim 1, wherein:
obtaining the MCC of the roaming area comprises obtaining the MCC of the roaming area according to at least one of: an obtained schedule, and obtained flight information, of the user;

the at least one of: an obtained schedule, and obtained flight information, of the user includes destination roaming area information; and obtaining the MCC of the roaming area according to the at least one of: the obtained schedule, and the obtained flight information, of the user comprises: obtaining the MCC of the destination roaming area.

13. The method according to claim 12, wherein obtaining the MCC of the roaming area according to at least one of: an obtained schedule, and obtained flight information, of the user comprises receiving at least one of: a schedule, and flight information, from the user at least one of:
before a plane takes off; and
after the user equipment is powered on in a destination roaming area.

14. The method according to claim 12, wherein:
the at least one of: an obtained schedule, and obtained flight information, of the user is stored in an application of the user equipment;
the application is used to provide the MCC of the destination roaming area; and
obtaining the MCC of the roaming area according to the at least one of: the obtained schedule, and the obtained flight information, of the user further comprises obtaining the MCC of the destination roaming area from the application.

15. The method of claim 1 further comprising obtaining the preferential roaming list from the network server by another user equipment.

16. The method according to claim 1 further comprising:
generating a search attempt list, wherein each element in the search attempt list includes a PLMN, a RAT supported by the PLMN, and an available frequency band of the RAT; and
selecting elements in the search attempt list one by one for searching for the selected network; and
after obtaining the available frequency bands of the RATs from the frequency band list to generate the search attempt list, deleting a RAT and a frequency band that are not supported by the user equipment from the search attempt list.

17. The apparatus according to claim 6, wherein the processor is further configured to one of:
obtain the MCC of the roaming area before the preferential roaming list is obtained;
obtain the MCC of the roaming area after the preferential roaming list is obtained; and
obtain the MCC of the remaining area and the preferential roaming list simultaneously.

18. The apparatus according to claim 6, wherein the processor is further configured to:
generate an available preferential roaming list, wherein to select a network that matches the MCC from the preferential roaming list, the processor is further configured to select a network in the available roaming list one by one;
obtain, by screening, a PLMN that matches the MCC from the preferential roaming list, wherein:
to generate the available preferential roaming list, the processor is further configured to generate the preferential roaming list with reference to a RAT that is recorded in the preferential roaming list and that is supported by the PLMN obtained by the screening; and
each element in the available roaming list includes information about the PLMN and information about the RAT supported by the PLMN.

19. The apparatus according to claim 18, wherein:
the historical roaming information includes: a first roaming network list and a second network list;
the first network list is used to record the first roaming network that the user equipment has successfully registered with during roaming; and
the second network list is used to record the second roaming network that the user equipment has failed to register with during roaming.

20. The apparatus according to claim 19, wherein, each time after the user equipment attempts to register with a PLMN found by the screening, the processor is further configured to:
update the historical roaming information according to whether the registration was successful.

21. The apparatus according to claim 20, wherein to update the historical roaming information according to whether the registration was successful, the processor is further configured to one of:
(a) when the historical roaming information includes the first roaming list:
  (i) for the user equipment failing to register with the PLMN found by the screening:
    determine whether the PLMN found by the screening appears in the first roaming network list; and
    in response to determining that the PLMN found by the screening appears in the first roaming network list, delete the PLMN found by the screening from the first network list; or
  (ii) for the user equipment successfully registering with the PLMN found by the screening:
    determine whether the PLMN found by the screening appears in the first roaming network list; and
    in response to determining that the PLMN found by the screening does not appear in the first roaming network list, add the PLMN found by the screening to the first network list; and
(b) when the historical roaming information includes the second roaming list:
  (i) for the user equipment failing to register with the PLMN found by the screening:
    determine whether the PLMN found by the screening appears in the second roaming network list; and
    in response to determining that the PLMN found by the screening appears in the second roaming network list, delete the PLMN found by the screening from the second network list; or
  (ii) for the user equipment successfully registering with the PLMN found by the screening:
    determine whether the PLMN found by the screening appears in the second roaming network list; and
    in response to determining that the PLMN found by the screening does not appear in the second roaming network list, add the PLMN found by the screening to the second network list.

* * * * *